3,256,014
DISPLAY DEVICE WITH TWO RHEOSTATS
Norman F. Kelsey, Philadelphia, Pa., assignor to Technical Displays Inc. (also known as Technical Displays, Inc. and Technical Displayers, Inc.), Philadelphia, Pa., a corporation of Pennsylvania
Filed Apr. 5, 1963, Ser. No. 270,933
3 Claims. (Cl. 272—8.5)

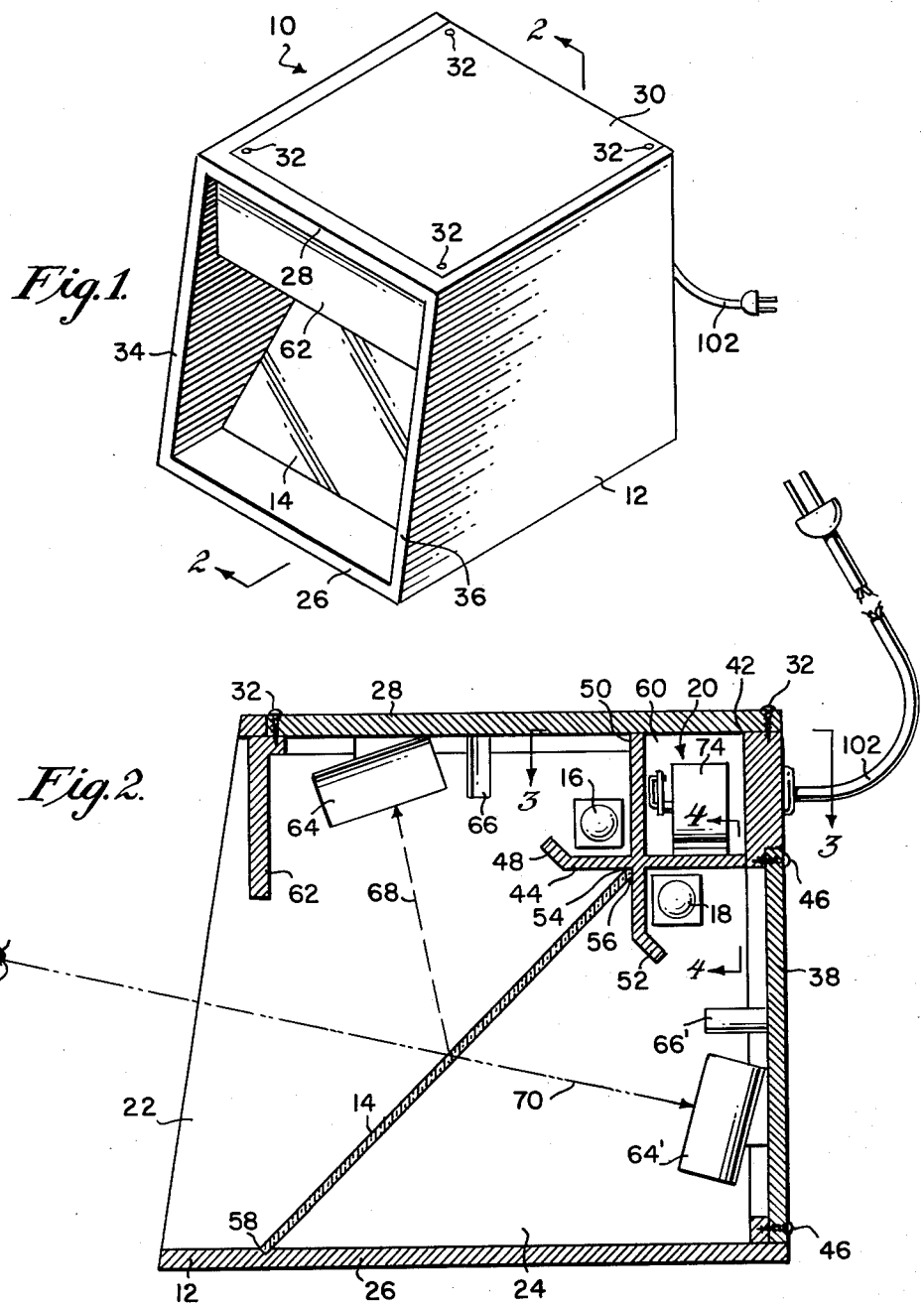

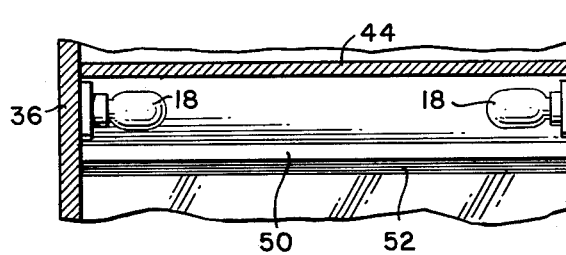
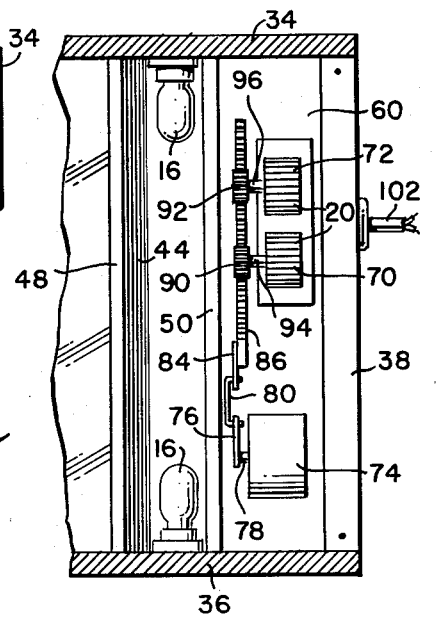
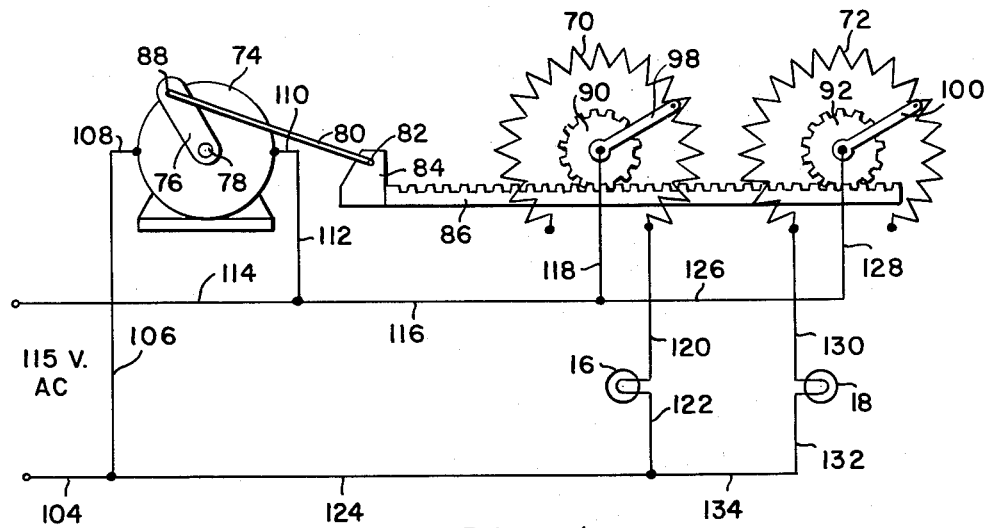

This invention relates to a novel display device with two rheostats and has as its objective the provision of a new and improved device of this general class.

Display devices are now widely used in presenting the features of a product. Toward this end it is most desirable that a display device attract the attention of viewers, and also demonstrate a product in a most flattering manner.

Accordingly, in the present invention there is provided a device whereby a product may be viewed in two positions or two features thereof may be specially displayed. The present invention also incorporates the attractive feature of having the view of one position fading away as the view of the second position becomes more and more prominent and is essentially superimposed upon the first view. For instance, where the packaging of an article is to be displayed, a view of the article in the package may be first presented. Then such a view is caused to fade away as the view of the contents of the package become more readily visible. This sequence is permitted to repeat itself so that the viewer will have an opportunity to orient himself to the two sequential presentations, and thereby create a lasting impression in his mind.

It is accordingly a principal object of the present invention to provide a novel display device with two rheostats whereby the views of two features of an article or an article in two different positions or conditions may be alternately shown to a viewer in a very interesting manner.

The foregoing as well as other objects of the present invention are achieved by providing a housing containing a "one-way" or transparent mirror which divides the housing into a front section and a rear section, with each of the sections being alternately and sequentially illuminated or darkened. When the front section of the housing is illuminated, a first object or a first condition or position of an object is viewable by reflection in connection with the mirror. When the rear section of the housing is illuminated, the second object or second condition or position of an article is viewable directly through the transparent mirror.

The effectiveness of the illusion created by the present invention is attributable to the sequential alternate brightening and dimming of the respective illuminating means. Thus, as the light grows dim in the front section of the housing, the light brightens in the rear section of the housing. In a similar manner when the light grows dim in the rear section of the housing, the light brightens in the front section of the housing thereby alternately making visible articles placed in the respective sections of the housing.

The foregoing sequential and alternate brightening and dimming of the respective illuminating means is achieved by means of a motor reciprocating a serrated rack which meshes with a pair of gears that in turn oscillate the arms of two separate rheostats which are arranged in opposing relationship. For this reason the resistance contributed by the first rheostat will increase as the resistance introduced by the second rheostat is decreased and vice versa.

The rheostats are positioned to increase the resistance in the circuit of one of the illuminating means and simultaneously to decrease the resistance in the circuit of the other illuminating means. In this way the sequential alternate brightening and dimming of the respective illuminating means is carried out.

Other objects and many of the attendant advantages of this invention will be readily appreciated as the same becomes better understood by reference to the following detailed description when considered in connection with the accompanying drawings wherein:

FIG. 1 is a perspective view of the novel display device of the present invention taken generally from the front thereof;

FIG. 2 is an enlarged sectional view taken along the lines 2—2 of FIG. 1;

FIG. 3 is a sectional view taken generally along the lines 3—3 of FIG. 2;

FIG. 4 is a sectional view taken along the lines 4—4 of FIG. 2; and

FIG. 5 is an enlarged schematic view including appropriate circuitry showing the operation of the two rheostat assembly of the present invention.

Referring now in greater detail to the various figures of the drawing wherein similar reference characters refer to similar parts, a display device constituting an embodiment of the present invention is generally shown at 10 in FIG. 1 and basically comprises a housing 12 having a "one-way" or transparent mirror 14 positioned therein at a 45° angle. Also positioned in housing 12 (FIG. 2) are front illuminating means 16, rear illuminating means 18 (including suitable sockets and leads therefor) and a rheostat assembly 20 for varying illuminating means 16 and 18 in a predetermined manner. The illuminating means may comprise two bulbs as shown in FIGS. 3 and 4, or more or less as desired.

As best shown in FIG. 2, the mirror 14 effectively divides the housing 12 into a front section 22 and rear section 24.

Turning now to the details of the housing 12 it is to be noted that it is basically comprised of a floor 26, a roof 28 with removable panel 30 (FIG. 1) held in place by wood screws 32. The housing 12 further comprises side walls 34 and 36 and rear wall 38. The front portion of the housing is open for purposes of permitting the eye 40 of a viewer to study certain objects placed inside of the housing 12 which are alternately rendered visible in a manner to be discussed in detail hereinafter.

In order to furnish support for certain important elements of the invention there is provided inside of the housing 12 adjacent the upper rear edge 42 thereof (formed by the meeting of roof 28 and rear wall 38) a horizontal shelf 44 which is secured to the rear wall 38 by means of wood screws 46. The front edge of the horizontal shelf 44 terminates in an angulated lip 48 to serve as a light baffle for illuminating means 16. In a similar manner a vertical panel 50 is secured to roof 28 and terminates in an angulated lip 52 which serves as a light baffle for illuminating means 18.

At the intersection of the horizontal shelf 44 and the vertical panel 50 (FIG. 2) there is a horizontal ledge 54 against which the upper edge 56 of mirror 14 rests. The lower edge 58 of the mirror rests upon the floor 26 and may be restrained in the position of FIG. 2 by stops or other well-known means (not shown) if so desired. As is further evident from FIG. 2, the shelf 44 and the vertical panel 50 in conjunction with a portion of roof 28 and the rear wall 38, define a storage area 60 for the retention of the rheostat assembly 20 and other actuating means in a manner to be hereinafter discussed.

A masking piece 62 is also provided adjacent the front of the assembly in order to conceal certain of the operative elements and mechanisms contained inside housing 12.

As further noted in FIG. 2, there are provided first objects 64 and 66 and second objects 64' and 66' which are to be made alternately visible as permitted by the co-action of illuminating means 16 and 18 and mirror 14.

In accordance with this invention front illuminating means 16 is brightest when rear illuminating means 18 is darkest. As front illuminating means 16 becomes less and less bright, the rear illuminating means 18 becomes more and more bright. This tendency continues for about 30 seconds or one minute and includes a period in which rear illuminating means 18 is very bright and front illuminating means 16 begins to brighten as the rear illuminating means 18 begins to darken. In this connection it is to be noted that the front and rear illuminating means may be collectively referred to as light control means.

It is to be noted from FIG. 2 that when front illuminating means 16 is very bright and therefore rear illuminating means 18 is dark, essentially only the front section 22 of the housing 12 will be illuminated. In this situation the first objects 64 and 66 are viewed by reflection in accordance with the dash line 68 of FIG. 2.

However, when the rear illuminating means 18 becomes very bright with front illuminating means 16 now darkened, essentially only the rear section 24 of housing 12 will be illuminated. In this situation, the second objects 64' and 66' are viewed directly through the mirror 14 along dash line 70 of FIG. 2. Moreover, the first objects 64 and 66 and the second objects 64' and 66' can be so positioned in the housing 12 that the reflected image of the objects 64 and 66 will appear precisely in the place of the direct view of the second objects 64' and 66'.

The fading and reappearance of the first and second objects is brought about by a gradual dimming of one of the illuminating means with the simultaneous brightening of the other illuminating means. This occurs by virtue of the two rheostat arrangement as illustrated in FIG. 5 of the drawing wherein the circuit of front illuminating means 16 is shown to include a first rheostat 70. In a similar manner, the circuit of the rear illuminating means 18 is shown to include a second rheostat 72. As further noted in FIGS. 3 and 5, the two rheostats 70 and 72 are in gang relationship or have their movable resistance arms simultaneously driven by means of a motor 74. This is accomplished by a crank-type arrangement which includes a link 76 secured to motor shaft 78. A rod 80 is secured to the outer end of the link 76 with the inner end of the link 76 being secured to the motor shaft 78. The distant end 82 of the rod 80 is secured to a flange 84 which extends from a serrated reciprocable rack 86.

Thus as the motor shaft 78 rotates, the link 76 is caused to rotate therewith with the end 88 of rod 80 thereby caused to travel through the circumferential path. This gives rise to a cranking action through rod 80 which leads to the reciprocation of the rack 86. Although not illustrated in the drawing, the rack 86 is positioned in a track or other support means and will slide back and forth in the track in accordance with the rotation of motor 74.

As further noted in FIGS. 3 and 5, a pair of gears 90 and 92 are provided and mesh with the rack 86 so that reciprocation of the rack 86 in turn causes a simultaneous oscillation of the gears 90 and 92. Secured for oscillation with the gears 90 and 92 are short shafts 94 and 96 which lead back respective to the rheostats 70 and 72 and particularly to the resistance arms thereof. In particular, oscillation of the gear 90 imparts oscillation to resistance arm 98 of rheostat 70 and oscillation of the gear 92 imparts oscillation to the resistance arm 100 of rheostat 72.

However, it is to be noted from FIG. 5 that the rheostats 70 and 72 are connected in opposing relationship with respect to each other, such that the simultaneous oscillation of resistance arms 98 and 100 in a given sense will introduce more resistance in the circuit of one of the illuminating means while simultaneously decreasing resistance in the other of the illuminating means. Thus as illustrated in FIG. 5, it may be assumed that the rack 86 is being reciprocated from right to left such that the resistance arms 98 and 100 are then being caused to oscillate in a clockwise direction. This has the effect of lessening the resistance in the circuit of illuminating means 16 while increasing the resistance of the circuit of illuminating means 18. Hence, in this part of the cycle the illuminating means 16 is brightening with the simultaneous dimming of illuminating means 18.

As further noted in FIG. 5, a source of power is provided and is brought to housing 12 by means of cable 102. The motor circuit includes conductors 104, 106, 108, 110 and 112. The circuit of illuminating means 16 includes conductors 114, 116, 118, resistance arm 98, a portion of the resistance winding of rheostat 70 as determined by the precise position of arm 98, conductors 120, 122, 124 and 104. The circuit of illuminating means 18 includes conductors 114, 116, 126, 128, resistance arm 100, a portion of the resistance winding of rheostat 72 as determined by the precise position of arm 100, conductors 130, 132, 134, 124 and 104.

In operation the cable 102 enables power to be fed to the motor 74 and also to illuminating means 16 and 18. The rotation of the motor 74 is converted into reciprocation of the rack 86 by means of the link 76 and the rod 80 as best shown in FIG. 5. Reciprocation of rack 86 then imparts oscillation to the resistance arms 98 and 100. Because the rheostats 70 and 72 are connected in opposing relationship with respect to each other, an increase in the resistance contributed by one rheostat (as one of the resistance arms moves) is accompanied by a simultaneous decrease in the resistance imparted by the other rheostat (as the other resistance arm moves). Inasmuch as one of the illuminating means is in the circuit of one of the rheostats of lessening resistance, said one illuminating means is caused to brighten while the other illuminating means (in the circuit of the rheostat of increasing resistance) is caused to darken. Hence, one section of the housing 12 is rendered increasingly brighter while the other section of the housing 12 is rendered increasingly darker. Then the cycle reverses with the dark section becoming brighter and the light section simultaneously becoming darker. When the front section 22 of housing 12 is brightened by illuminating means 16, first objects 64 and 66 may be viewed by reflection against the "one-way" mirror 14. At this time rear section 24 is quite dark. As the front section 22 becomes darker (by virtue of increased resistance placed in the circuit of illuminating means 16 by the movement of arm 98 of rheostat 70 in a counterclockwise direction as viewed in FIG. 5) the illuminating means 18 is simultaneously growing brighter. This is caused by the oscillation of arm 100 in a counterclockwise sense which has the effect of eliminating considerable resistance of the circuit illuminating means 18 as power travels from the arm 100 only through a short section of resistance of rheostat 72 to the conductor 130. When the rear illuminating means 18 is very bright, the front illuminating means 16 will be quite dark. Thus the rear section 24 of the housing 12 will be bright and the front section 22 of the housing 12 will be quite dark. In this condition the bright material behind the mirror 14 may be directly viewed as the mirror 14 no longer reflects, but rather permits light to pass through it.

It is thus seen that the cycle of brightening and darkening will continue many times and thereby permit the viewer to note the details of two positions of a particular article or two features thereof in a most striking manner. Also, the apparatus of the present invention is reliable and susceptible to easy maintenance.

Furthermore, by precise positioning of the respective articles in the front and rear sections of the housing, the image of one article will be precisely superimposed on the view of the other article, thereby enhancing the fading effect. It is further seen than when illuminating means 16 and 18 are of equal brightness the superimposed image and view will be of equal intensity, and that thereafter, one will disappear gradually as the other becomes more evident.

Obviously many modifications and variations of the present invention are possible in the light of the above teachings. It is, therefore, to be understood that within the scope of the appended claims, the invention may be practiced otherwise than as specifically described.

What is claimed as the invention is:

1. A novel display device comprising a housing containing a light transmitting mirror dividing the housing into a front section and a rear section, front illuminating means adapted to illuminate said front section and rear illuminating means adapted to illuminate said rear section, and light control means to sequentially and alternately brighten one of said illuminating means while simultaneously darkening the other of said illuminating means, said light control means comprising a first rheostat in the circuit of said front illuminating means and a second rheostat in the circuit of said rear illuminating means, said rheostats being separate from each other and being disposed in opposing relationship with respect to each other, and each rheostat including a separate resistance dividing arm which is adapted to be oscillated with the arm of the other rheostat in a first sense and then in a second sense, motor means for separately oscillating said arms, the resistance in the respective circuits of said two illuminating means being gradually varied and essentially determined by the positions of said arms whereby a cycle is provided wherein at a first point one of said illuminating means brightens as the other of said illuminating means becomes darker, until a second point is attained, at which point a reversal is initiated so that the darkened illuminating means will start to become brighter as the brightened illuminating means will start to become darker until said first point in the cycle is attained.

2. The invention of claim 1 including a first object placed in the front section of said housing and a second object placed in the rear section of said housing, said first object being viewable as an image by reflection when the front section of said housing is illuminated and said second object being directly viewable as a direct view through said mirror when the rear section of said housing is illuminated, said objects being so positioned with respect to each other, that said image and said direct view will essentially coincide whereby the sequential, alternate brightening and dimming of said illuminating means causes said image and direct view to appear and fade in a sequential and alternate manner.

3. The invention of claim 2 including a crank-type arrangement connecting said motor means with said resistance dividing arms, said crank-type arrangement comprising a link adapted to be rotated by said motor so that the outer end of said link proscribes a circular path, a rod having one end secured to the outer end of said link with the other end of said rod being secured to a serrated reciprocable rack whereby said motor means reciprocates said rack, gear means adapted to be oscillated by said rack, each of said resistance dividing arms being secured to one of said gear means for oscillation therewith.

References Cited by the Examiner
UNITED STATES PATENTS 2,487,307  11/1949  Cassidy _____ 272—8.5

RICHARD C. PINKHAM, *Primary Examiner.*

F. B. LEONARD, *Assistant Examiner.*